United States Patent [19]

Kervagoret

[11] 4,413,962
[45] Nov. 8, 1983

[54] TORQUE-AMPLIFYING SERVO-MECHANISM WITH COMPACT STRUCTURE FOR POWER STEERING SYSTEMS

[75] Inventor: Gilbert Kervagoret, Argenteuil, France

[73] Assignee: Societe Anonyme DBA, Paris, France

[21] Appl. No.: 303,309

[22] Filed: Sep. 17, 1981

[51] Int. Cl.³ .................. F04G 15/04; F04G 29/10
[52] U.S. Cl. ............................ 418/186; 418/248
[58] Field of Search ............... 180/149; 418/185, 186, 418/187, 243, 248, 249

[56] References Cited

U.S. PATENT DOCUMENTS

| | | | |
|---|---|---|---|
| 2,524,682 | 10/1950 | Staude | 121/41 |
| 3,131,602 | 5/1964 | Ford | 91/137 |
| 4,040,502 | 8/1977 | Yoshida | 180/149 |
| 4,137,989 | 2/1979 | Rehfeld | 418/248 |

FOREIGN PATENT DOCUMENTS 1921283 10/1969 Fed. Rep. of Germany .
2412728 7/1979 France .

Primary Examiner—Leonard E. Smith
Assistant Examiner—Jane Obee
Attorney, Agent, or Firm—Paul David Schoenle; Ken C. Decker

[57] ABSTRACT

Torque-amplifying servomechanism particularly for use in motor vehicle power steering systems, having the advantage of occupying less space in the axial sense; The device provided by the invention is made up by the association of a hydraulic motor of the vane type and a rotary piston, known per se and secondly, a fluid distributor of the valve spool type said spool being arranged actually inside the body of the rotary piston.

5 Claims, 3 Drawing Figures

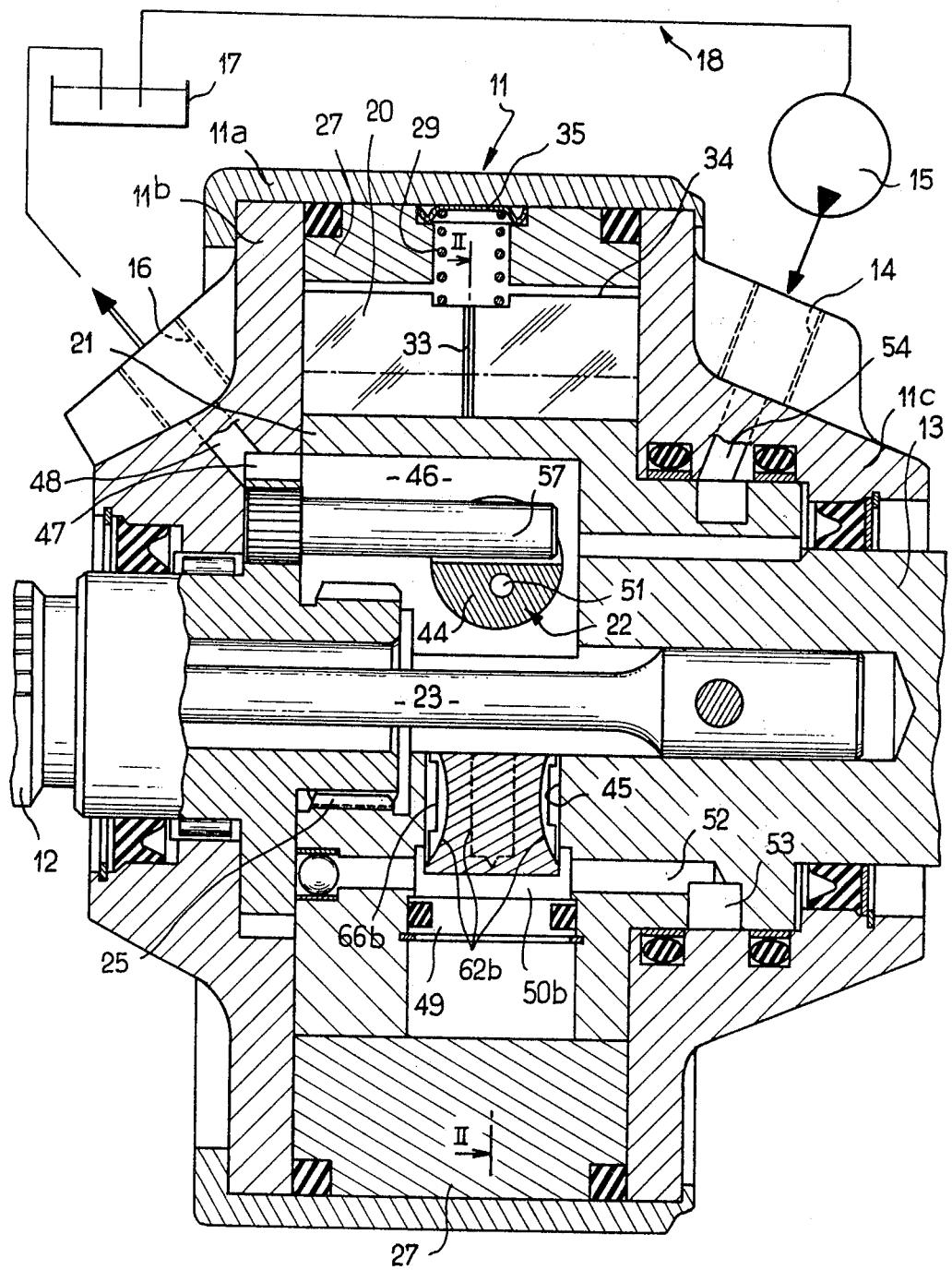
FIG_1

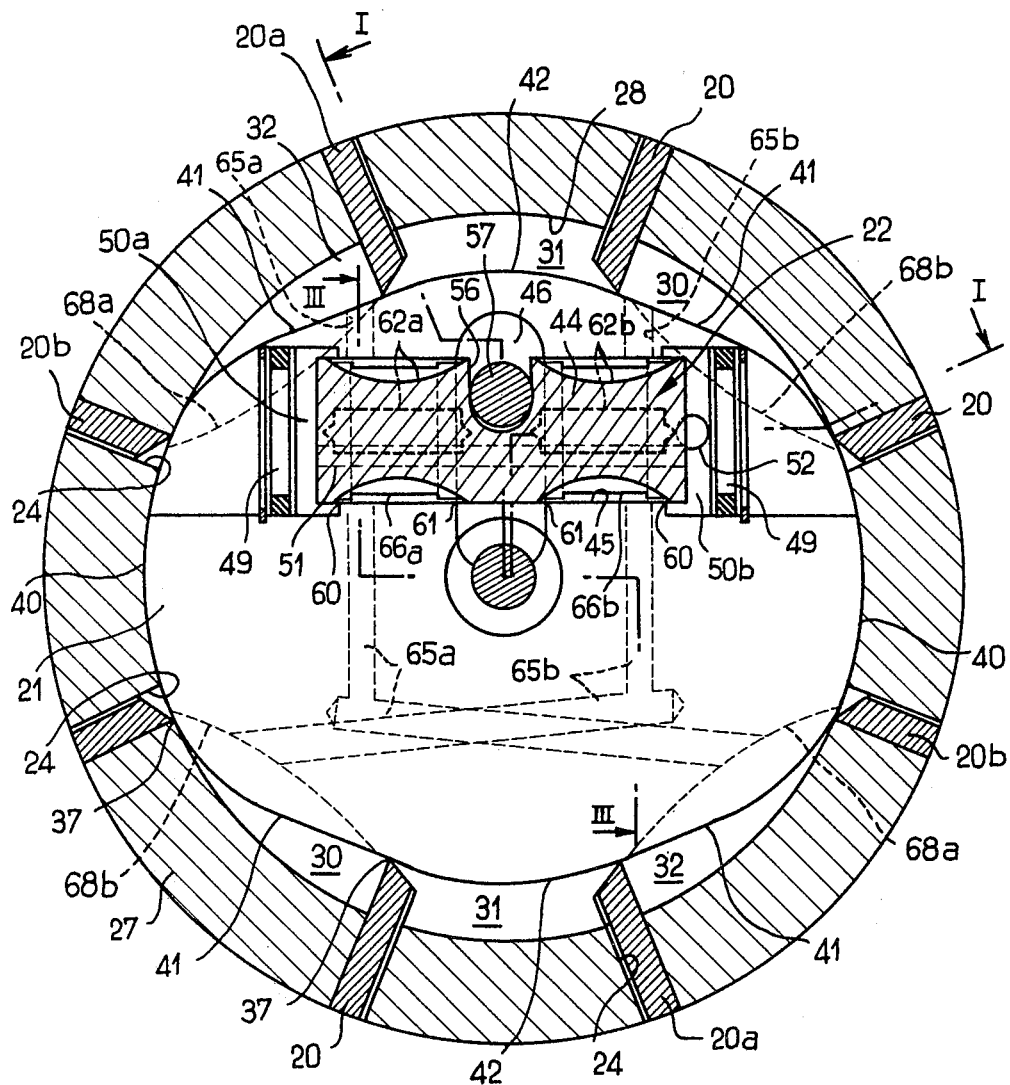
FIG_2

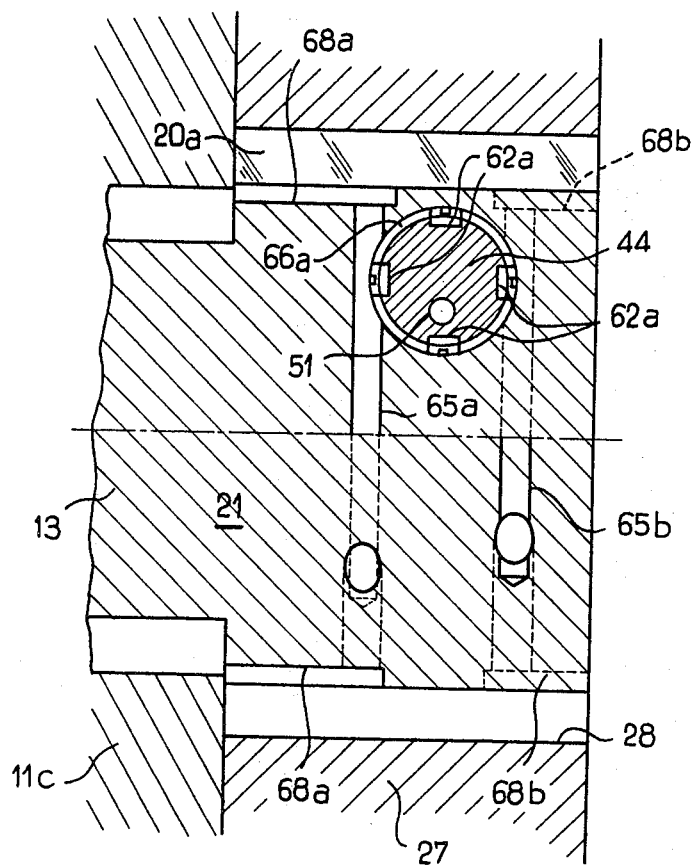
FIG_3

TORQUE-AMPLIFYING SERVO-MECHANISM WITH COMPACT STRUCTURE FOR POWER STEERING SYSTEMS

The invention relates to a torque-amplifying servo-mechanism which is particularly intended for use with the power steering system of a motor vehicle.

The essential aim of the invention is to put forward such a servomechanism which includes both the fluid distributor and the hydraulic motor which is piloted by this distributor, united together in the same casing which occupies a reduced amount of space in the axial sense. A servomechanism of this type has already been proposed and this includes in the same casing a hydraulic distributor interconnected in a fluid circulation circuit between a fluid source such as, for example, a constant delivery pump, and a fluid reservoir or tank as well as a hydraulic motor of the vane type. This type of motor is known and generally comprises a cylindrical cavity inside which a rotary piston having a non-cylindrical lateral surface is mounted. The axis of rotation of the piston coincides with the axis of the cavity and in practice is provided by an outlet shaft which can be directly coupled to the system for steering the wheels of the vehicle. The non-cylindrical piston includes two opposing bearing surfaces which are in contact with the internal wall of the cavity, for allowing rotation of the piston. These two bearing surfaces are separated by portions which are spaced from the internal wall of the cavity and include, in particular plane regions. Movable vanes are further provided, and these are arranged in the wall of the cavity so as to project substantially radially towards the inside of the cavity and occupy the whole of its axial length. They are urged by springs towards the piston, in order that they may be constantly in contact with its lateral surface, independently of the angular position of said piston inside the cavity. In this way, several chambers of variable volume are formed at the periphery of the piston, these being closed in the radial sense by the vanes. On the other hand, as the lateral surface of the piston is provided with plane regions, fluid under pressure which is introduced into one or several chambers can create a force on such regions, the resultant of which does not pass through the axis of rotation of the piston. The torque produced in this way is put to use for furnishing the desired assisting force to the steering system of the vehicle. The task of the distributor referred to above is, obviously, that of regulating the variations in pressure in certain chambers, as a result of information taken from the driver, in order to obtain the additional torque in the desired direction. Up until now, a distributor has been used of a type essentially made up by two discs rotatably mounted in the casing, arranged coaxially with respect to the rotary piston and located in an extension of the casing. One disc, the control disc, is connected to an input shaft so as to be caused to rotate by the driver and a follower disc is rigidly fixed to the rotary piston of the vaned motor, said follower disc being located in a sealed manner between the rotary piston and the control disc. In the conventional manner, the control disc and the follower disc (and consequently the rotary piston) are elastically coupled in rotation by means of a torsion bar. The two discs further include orifices and chambers which provide for distribution and fluid pressure build-up (in the case of servo-steering of the "open centre" type) in the chambers of the motor having the vanes as described above, for obtaining the desired additional torque.

Such a system operates in a satisfactory manner but does nevertheless occupy a fairly large amount of space in the axial sense. In practice, the rotary piston does of necessity take up a not inconsiderable amount of space in the axial direction which is imposed by the surface of the active regions of the piston. But the addition to this of a distributor of the type described above has, of necessity, the end effect of increasing yet again the axial length of the casing since the two discs can only be arranged on the extension of the rotary piston of the motor. Furthermore, the orifices and chambers defined in the discs of the distributor require complicated machining to form them and this has to be done at a high degree of accuracy in order to obtain satisfactory distribution characteristics. The cost price of such a distributor is consequently on the high side.

The invention makes it possible to overcome all these disadvantages and particularly proposes:
 the use of a distributor based on a simpler design, in fact a distributor of the valve spool type;
 the integration of this distributor of the spool type inside the actual body of the rotary piston of the motor having the vanes, leading to the formation of a complete unit occupying the minimum amount of space in the axial direction.

Using this basic concept, the invention basically provides a hydraulic servomechanism of the type comprising a common casing enclosing a fluid distributor and a hydraulic motor having movable vanes and a rotary piston with a non-circular outer surface rotatably mounted in a cylindrical cavity into which said vanes project, these being held in contact with the lateral surface of said piston in order to define together with said lateral surface and said casing, pressure chambers which communicate with said distributor, which further comprises means for connecting it to a fluid source and to a reservoir or tank, an input shaft being coupled to said distributor and an output shaft being linked to said rotary piston, an elastic coupling means being arranged between said input shaft and said output shaft in order to define, in the rest position, a neutral relative angular position between these two shafts, characterized in that said distributor is made up by a valve spool slidably mounted in a transverse passage of said rotary piston and being adapted to become displaced in said passage under the control of said input shaft, that this valve spool includes at least two hollow portions at its outer surface each defining together with shoulders on said passage two paths of variable section communicating respectively with said fluid source and said reservoir and that conduits are formed in said rotary piston for providing fluid communication between each one of said hollow portions and selected regions of said lateral surface of said rotary piston for supplying the above-stated pressure chambers.

The invention will be better understood and further advantages provided by it will become more clear as a result of reading the description of one preferred embodiment of a servomechanism conforming to the principles of the invention, which is given solely by way of example carried out with reference to the non-limiting attached drawings in which:

FIG. 1 is a schematic longitudinal cross-section of a servomechanism according to the invention, shown according to the line I—I in FIG. 2;

FIG. 2 is a diametrical cross-section of the central portion of the motor provided with it vanes, taken at the level of the distributor along line II—II of FIG. 1; and FIG. 3 is a partial longitudinal cross-section along line III—III in FIG. 2.

With reference to the drawings, the servomechanism comprises a casing 11 of generally cylindrical shape and made up by assembling together a shroud 11a and two shells 11b, 11c from which two aligned and opposed shafts project, namely an input shaft 12 and an output shaft 13. The input shaft 12 is designed to be connected to a steering column (not shown) of the vehicle whereas the output shaft 13 is designed to be coupled to the steering mechanism of the wheels (not shown) of said vehicle. The casing also comprises an oil inlet 14 to be connected to the output of a constant-flow pump 15 and an oil outlet 16 to be connected to an oil tank 17. Consequently the servomechanism is hydraulically inserted in a fluid flow circuit 18 schematically shown on FIG. 1; the pump 15 drawing oil from tank 17. The casing 11 houses, on one hand, an hydraulic motor of the type comprising eight vanes 20 and a rotary piston 21 having a non circular perimeter and, on the other hand, a fluid distributor 22. The output shaft is connected to the piston 21 and located in the axial extension thereof. Both shafts 12 and 13 each further comprise an axial bore so as to form the housing of a torsion bar 23. This torsion bar is affixed at each end to said input and output shafts, respectively, and consequently is an elastic connecting means of these shafts, defining in the rest position a neutral relative angular position therebetween. Corrugations 25 are provided at the end of shaft 12 and on a confronting cylindrical portion of the rotary piston 21 to abut each other when a little angular play between shafts 12 and 13 is exceeded, this being for example of the order of 7°. Hence, the mechanism for steering the wheels can if necessary be operated directly by the driver, at the cost of having to apply greater forces to the wheel, should the servomechanism fail, resulting notably from a breakdown in the supply of oil. A metal ring 27 is held immobile inside the casing 11 and defines a cylindrical cavity 28 in which piston 21 is able to perform its rotary motion. The vanes 20, 20a and 20b are slidably mounted in housings 24 in the ring 27. They are urged in the direction of the lateral surface of piston 21 by means of springs 29 in order to always be in contact with this surface (FIG. 2). Thus, pressure chambers 30, 31, 32 which will be described in greater detail below, are defined in chamber 28 by the vanes and certain portions of the lateral surface of piston 21. It should be noted that one of the faces of each vane includes a fine groove 33 in order to subject the external radial edge 34 of the vane to the same pressure as is exercised on its internal radial edge. This balancing of the vane makes it possible to substantially reduce the contribution of the spring 29 urging said vane in the direction of the rotary piston. A closing member 35 made up by a membrane bearing on a metal washer provides for sealing at the point of the radial drilling in ring 27 forming the housing for spring 29. The internal radial edge of each vane is tapered so that the contact with the lateral surface of the rotary piston only occurs along a fine edge 37. On the other hand, housings 24 are formed in the ring 27 so that these fine edges 37 move in radial planes of the cylindrical chamber 28 when rotation of piston 21 occurs.

As has been said above, the motor piston 21 has a non-circular outer peripheral contour as can be seen in FIG. 2. More precisely, it has two cylindrical bearing surfaces 40 arranged diametrically opposite to each other and in contact with the cylindrical surface of the cavity 28. These bearing surfaces provide for guiding the rotation of the piston. They are separated by portions which are spaced from the internal wall of the cavity 28 thus defining, in cooperation with the vanes, pressure chambers 30, 31, 32 which were referred to above. Between the two bearing surfaces 40, the peripheral surface of the piston 21 includes two plane regions 41 which are connected, respectively, to the cylindrical bearing surfaces 40 by a slightly rounded portion and are linked to each other by a median region 42 inscribed on a cylindrical surface coaxial with the cylindrical surface of cavity 28. The result of this arrangement is that forces resulting from the action of pressure on the median regions 42 will not have an effect on the piston since their resultant will pass through the axis of rotation of the latter. On the other hand, forces developed on the plane regions 41 will exercise torque on the rotary piston, determining its angular displacement inside the cavity 28, and accordingly angular displacement of output shaft 13.

According to the invention, the fluid distributor 22 is made up by a cylindrical valve spool 44 slidably mounted in a transverse bore 45 formed in piston 21. The passage 45 opens, at its mid portion, into a cavity 46 in the piston 21, which cavity communicates with the outlet union 16 thanks to the provision of an annular space 47 defined in shell 11b of the casing 11 and a discharge conduit 48 (FIG. 1). Regarding the bore 45 itself, it comprises a mid-section of a diameter corresponding to that of the spool 44 and two symmetrical end sections, having a greater diameter and opening externally in the peripheral surface of piston 21. The two end sections are closed in a sealed manner by means of closing caps 49 and thus define together with the axially opposed end faces of spool 44 two chambers 50a, 50b communicating through a longitudinal drilling 51 in the spool 44. Chamber 50b is connected to the inlet union 14, via a path comprising in turn, an axially extending conduit 52 and an annular groove 53 in the output shaft and a conduit 54 formed in the shell 11c of the casing between the annular groove 53 and the union 14. The spool 14 is formed with a transverse notch 56 at its central point with in which is received an operating pin 57, rigidly fixed to the input shaft 12. This pin which extends into the cavity 46 is offset with respect to the axis of the input shaft thus making it possible to displace the spool 44 in its passage, as a result of an angular displacement of the input shaft. Two radially extending shoulders 60 are defined between the mid section of the bore 45 and each chamber 50a, 50b of enlarged diameter whilst two further facing shoulders 61 are defined between this same mid section of bore 45 and the cavity 46. In the embodiment shown, Two groups of four longitudinally extending recesses 62 (each in the form of a closed groove having a curved bottom) are formed in the peripheral surface of spool 44, on each side of the notch 56. These recesses cooperate with the shoulders defined above to form together with the latter, passages of variable sections depending upon displacement of spool 44 within bore 45, and communicating respectively with the fluid source (pump 15) and with the reservoir 17. The recesses of each group (62a or 62b) are evenly angularly spaced on the cylindrical peripheral surface of the spool, more precisely the recesses 62a of one group define, together with shoulder 60 of chamber 50a and shoulder 61 corresponding to the cavity 46, two fluid passages of variable section having inverse variations in opening since an increase in fluid flow section at the side corresponding to chamber 50a is accompanied by a decrease in the fluid flow section towards cavity 46, and vice-versa. In an analogous manner, the recesses 62b of the second group, define together with shoulder 60 of chamber 50b and the shoulder 61 corresponding to the cavity 46, two fluid passages having variable section and inverse variations in opening. The opposite ends of recesses, e.g. grooves 62 cooperate with the shoulders 60 and 61 and in order to provide for this have their edges machined to correspond to one selected profile, in order to obtain a predetermined torque pressure characteristic. The fluid distribution system is completed by conduits formed in the rotary piston 21 for establishing fluid communication between each of the groups of recesses 62a, 62b and selected regions of the peripheral outer surface of the piston, in order to supply the pressure chambers 30, 31, 32 referred to above. A conduit 65a can be seen, which communicates with all the recesses 62a of the first group via an annular groove 66a formed at the peripheral surface of spool 44 for intercommunicating all the recesses 62a, and a conduit 65b which communicates with all the recesses 62b through an annular groove 66b formed at the peripheral surface of spool 44 in order to intercommunicate all the recesses 62b. As can be seen in FIG. 3, the conduit 65a opens into the portion of the bore 45 facing the annular groove 66a whilst the conduit 65b opens into the portion of bore 45 facing the annular groove 66b. Finally, it should be noted that each conduit 65a or 65b further discharges into two inwardly recessed portions 68a or 68b respectively, which are on opposing sides with respect to the axis of rotation of piston 21 and are formed in the lateral peripheral surface of the latter, each said recessed portion extending angularly over a portion of said lateral peripheral surface corresponding at least to an angular sector of the cylindrical cavity 28 bounded by two neighboring vanes 20a and 20b, this being 45° in the example shown. The location and the angular distribution of the recessed portions 68 substantially corresponds to those of the plane regions 41 of the lateral peripheral surface of the piston.

Operation of the device is as follows: at rest and in a position of the steering column corresponding to when the vehicle is being steered in a straight line, the different consecutive parts of the servomechanism occupy the relative positions which are shown in the drawings. With reference in particular to FIG. 2, it will be seen that the pressure chambers 30 and 32, these being four in number and diametrically opposed two by two in the illustrated embodiment, are bounded partly by the plane regions 41 of the rotary piston 21 whilst the pressure chambers 31 are bounded in part by the median regions 42. Moreover, the recessed portions 68a are substantially completely situated in the chambers 32 whilst the recessed portions 68b are situated substantially completely in the chambers 30. In this position, the spool 44 is held central with respect to the bore 45. Consequently, the fluid passages of variable section defined above all offer the same fluid flow cross-section and the amount of oil under pressure supplied by the pump is divided into two equal flows passing through the chamber 50a and the spool recesses 62a on one side, and the chamber 50b and the spool recesses 62b on the other, before returning to the reservoir 17 via the cavity 46.

The pressures set in conduits 65a and 65b are consequently equal so that the pressure chambers 30 and 32 are kept at equal pressures. Given the shape of the rotary piston 21 and the location of the pressure chambers 30, 32 with respect to the latter, the turning moments created on the plane regions 41 cancel each other out. The rest position is consequently stable. In the driver of a vehicle provided with a steering system equipped with such a servomechanism steers the vehicle towards the right, which corresponds to a rotation of the output shaft and of piston 21 in the counter-clockwise sense when considering FIG. 2, the reaction of the front wheels first leads to a resistance at the output shaft 13 with respect to the steering force transmitted to the input shaft 12, and consequently results in slight twisting of the torsion bar 23. The control pin 57 consequently urges the spool 44 to the right into bore 45 when considering FIG. 2, whereby causing a tendency to isolate the spool recesses 62a and the conduit 65a from reservoir 17 and, contrary to this, to increasingly open the flow path between the spool recesses 62b and the cavity 46. Pressure consequently increases in conduit 65a whilst the low pressure set up in conduit 65b corresponds substantially to the pressure in the tank. The consequences at the pressure chambers are as follows: pressure in the chambers 32 increases; and the pressure in chambers 30 and 31 tends to be reduced to the pressure prevailing in the reservoir, since the chambers 30 and 31 are put into communication by the recessed portions 68b as soon as piston 21 starts to rotate.

Consequently, a torque is created on the piston 21 or the output shaft 13 by the action of the pressure on the two opposite substantially flat active surfaces 41 of piston 21, these corresponding to chambers 32. The direction of the turning moment obtained corresponds well to the additional steering power desired. During a first rotation through 45°, certain vanes (20a in FIG. 2) bear the pressure difference between the active chambers 32 and the adjacent low pressure chambers 30, 31 and beyond this first rotation, it is the neighbouring vanes (vanes 20b in FIG. 2) which bear this pressure difference during supplementary rotation through 45° in the same sense. The rotational movement of piston 21 is thus able to continue in the same sense while the driver is turning the wheel in this sense. When the driver stops exercising an operating torque on the input shaft 21 the torsion bar 23 has a tendency, whilst regaining its equilibrium, to bring back the spool 44 to a central position in the bore 45 so that the pressure unbalance in chambers 32, on the one hand, and 30, 31 on the other, disappears. In a similar manner, Steering the vehicle to the right produces a pressure unbalance to the advantage of chambers 30 so that the power steering torque, created by the action of the pressure on the corresponding plane regions 41, is directed in the opposite direction.

Obviously, the invention is not limited to the embodiment which has just been described. It comprises all technical equivalents of the means employed if the latter are employed in a device defined by the scope of the following claims.

I claim:

1. A hydraulic servomechanism of the type comprising a common casing enclosing a fluid distributor and a hydraulic motor having movable vanes and a rotary piston with a non-circular contour rotatably mounted in a cylindrical cavity into which said vanes project, these being held in contact with the lateral surface of said piston in order to define together with said lateral surface and said casing pressure chambers which communicate with said distributor, which further comprises fluid connecting means for connecting it to a fluid source and to a reservoir, an input shaft being coupled to said distributor and an output shaft being linked to said rotary piston, an elastic coupling means being arranged between said input shaft and said output shaft in order to define, in a rest position, a neutral relative angular position between said shafts, characterized in that said distributor comprises a valve spool slidably mounted in a transverse bore formed in said rotating piston and being adapted to become displaced in said bore under the control of said input shaft, the valve spool includes at least two recesses at its outer surface, each defining, together with shoulders in said bore, two fluid flow paths of variable section communicating respectively with said fluid source and said reservoir, conduits are formed in said rotary piston for providing fluid communication between each one of said recesses and selected regions of said lateral surface of said rotary piston, for supplying fluid to said pressure chambers, an operating pin is eccentric and rigidly fixed to said input shaft and movable in a cavity of said rotary piston, said operating pin is in engagement with said spool for operating it, the axial ends of said spool are adjacent two opposing chambers, respectively, in communication with said fluid source, said cavity communicating with said reservoir and said recesses of said spool are formed longitudinally, respectively between each chamber and said cavity in order to define together with said shoulders said fluid flow paths of variable sections.

2. A servomechanism in accordance with claim 1, characterized in that said conduits discharge into opposing recessed portions formed on said lateral surface of said piston and each extending over a portion of said surface corresponding at least to an angular sector defined by two neighboring vanes (20).

3. A servomechanism in accordance with claim 1, characterized by two groups of several similar longitudinal recesses formed in circular symmetry at the surface of said valve spool.

4. A servomechanism in accordance with claim 1, characterized in that two circular grooves are in communication, respectively, with each of said two recesses, said two circular grooves are also formed on the surface of said spool and that the two conduits open into said bore (45) adjacent one of said circular grooves.

5. A servomechanism in accordance with claim 4, characterized by a longitudinal drilling formed in said spool from one end to the other, for providing fluid communication between the two chambers, one of these chambers being fluidly connected to said fluid connecting means for providing connection of said distributor to said fluid source.

* * * * *